United States Patent [19]

Nishida et al.

[11] Patent Number: 4,585,966
[45] Date of Patent: Apr. 29, 1986

[54] SUBMERGED ELECTRIC MOTOR

[75] Inventors: Mitsuhiro Nishida; Sakuei Yamamoto; Hiroshi Inao, all of Fukuoka, Japan

[73] Assignee: Mitsubishi Denki Kabushiki Kaisha, Tokyo, Japan

[21] Appl. No.: 662,974

[22] Filed: Oct. 18, 1984

[30] Foreign Application Priority Data

Oct. 20, 1983 [JP] Japan ................. 58-197778

[51] Int. Cl.⁴ .............................................. H02K 5/12
[52] U.S. Cl. ......................................... 310/87; 310/43; 310/89; 277/11; 277/188 R
[58] Field of Search ................. 310/86, 87, 85, 88, 310/43, 58, 54, 90, 89, 91; 277/11, 188 R

[56] References Cited

U.S. PATENT DOCUMENTS

| 2,938,131 | 5/1960 | Maynard | 310/87 |
| 2,944,297 | 6/1960 | Maynard | 310/87 |
| 3,128,712 | 4/1964 | Sence | 310/86 |
| 3,135,211 | 6/1964 | Pezzillo | 310/87 |
| 3,188,968 | 6/1965 | McMahan | 310/87 |
| 4,387,313 | 6/1983 | Yamamoto | 310/87 |

FOREIGN PATENT DOCUMENTS

| 0687115 | 3/1965 | Italy | 310/87 |
| 57-119643 | 7/1982 | Japan . | |

Primary Examiner—R. Skudy
Attorney, Agent, or Firm—Wenderoth, Lind & Ponack

[57] ABSTRACT

A submerged electric motor has a molded bracket fitted into a hollow cylindrical molded member for a canned stator to cause an annular sealing member to abut against a radial front end surface connected to a cylindrical surface abutting against that of the molded member and another cylindrical surface connected to the front end surface on the bracket side and against an axial extension of the abutting cylindrical surface and a radial bottom surface connected to each other on the molded member side while a can disposed on the inner surface of the molded member has an extension radially outward bent so as to be sandwiched between the sealing member and the bottom surface.

16 Claims, 6 Drawing Figures

SUBMERGED ELECTRIC MOTOR

BACKGROUND OF THE INVENTION

This invention relates to a submersible electric motor, and more particularly to improvements in a sealing device operatively associated with a submersible electric motor comprising a molded member encapsulating a stator except for the inner surface provided with a can and connected to a bracket through a socket and spigot joint so as to block a stream of a cooling and lubricating liquid flowing within the bracket and that of ambient water across the molded member and the can.

A conventional submersible electric motor of the type referred to has comprised a stator including a molded member of a synthetic resin encapsulating the main body of the stator except for the inner cylindrical surface thereof and burying an associated electric component in one end portion thereof, the molded member having an inner cylindrical surface flush with that of the main stator body except for both end portions thereof, a hollow cylindrical can of, for example, thin sheet stainless steel disposed on the inner cylindrical surfaces of the molded member and the main stator body, a molded bracket connected to the end portion of the molded member through a socket and spigot joint, the bracket journalling a rotor shaft and enabling a cooling and lubricating liquid to flow therein, and an annular sealing member inserted into a circumferential groove disposed on that end portion of the bracket inserted into the molded member to engage the can.

This sealing member has been effective for preventing the cooling and lubricating liquid which comes between the can and the bracket from the rotor side and then reaches the same, from going over the sealing member. On the other hand, ambient water might come between the molded member and the bracket until it reaches the end surface of the can. Then the water has been divided into one portion which comes between the can and the bracket, and the other portion which comes between the molded member of the stator and the can. The one portion of the water has reached the sealing member after which it is prevented from further advancing between the bracket and the can by means of the sealing member. On the other hand, the molded member of the stator and the can have included respective joined surfaces exposed to the other portion of the water. If an exfoliation occurs between the joined surfaces of the molded member and the can then the other portion of the water reaches the exfoliated surface portion to further facilitate the exfoliation of the molded member from the can as well as causing the water to penetrate the molded member of the stator through the exfoliated surface portion or portions. This has resulted in the disadvantage that the electric component buried in the molded member decreases in insulation resistance.

Accordingly, it is an object of the present invention to provide in a submerged electric motor such as described above, a new and improved sealing device retaining the advantages of the prior art practice that the cooling and lubricating liquid is prevented from flowing out of the electric motor and ambient water is prevented from flowing into the interior of the electric motor, and furthermore effective for preventing ambient water having come between abutting surfaces of the molded member of the stator and the bracket from advancing between the can and the molded member.

SUMMARY OF THE INVENTION

The present invention provides a submersible electric motor comprising a stator encapsulated by a hollow cylindrical molded member of a synthetic resin except for an inner cylindrical surface thereof, a hollow cylindrical can disposed on the inner cylindrical surface of the stator and extended to be disposed on an inner cylindrical surface of the molded member flush with that of the stator except for both end portions thereof, and a bracket connected on one end portion to an associated end portion of the molded member of the stator through a socket and spigot joint and journalling a rotor shaft. The socket and spigot joint include at least cylindrical surfaces of the molded member and the bracket coaxial with the common longitudinal axis thereof, the cylindrical surface of the bracket abutting against an end portion of the cylindrical surface of the molded member located on said associated end portion thereof. The can is provided on the end portion adjacent to the bracket with an extension extending beyond a radial bottom surface in the form of an annulus connected on the radially outer periphery to the cylindrical surface of the molded member, and an annular sealing member is located between and abuts against at least one of a front and an end surface of the extension and at least one of the abutting cylindrical surface of the molded member, and the bottom surface, at least one portion of the sealing member abutting against a radial front end surface in the form of an annulus of the bracket connected on a radially outer periphery to the abutting cylindrical surface thereof to be put in spaced parallel relationship with the radial bottom surface of the molded member whereby the annular sealing member is compressed enough to prevent a cooling and lubricating liquid flowing in the bracket from flowing out from the bracket and also prevent ambient water from entering the interior of the bracket.

In a preferred embodiment of the present invention, the extension of the can may be radially outward bent at a right angle to the main body of the can to form a flange.

The flange may have a rear surface abutting against the radial bottom surface connected to the cylindrical surface of the molded member. Alternatively, the flange may be inserted into a circumferential groove disposed on a radially inner surface of the sealing member.

BRIEF DESCRIPTION OF THE DRAWINGS

The present invention will become more readily apparent from the following detailed description taken in conjunction with the accompanying drawings in which.

Throughout the Figures like reference numerals and characters designate the identical or corresponding components.

DESCRIPTION OF THE PREFERRED EMBODIMENTS

Figure 1:
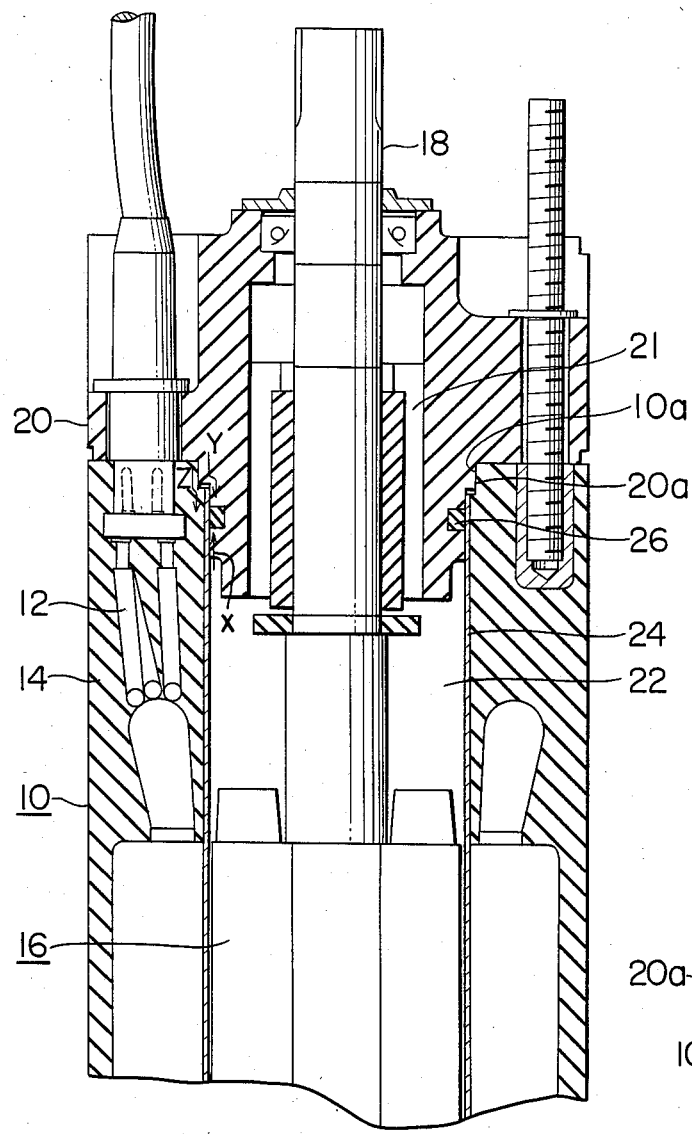
FIG. 1 is a fragmental longitudinal sectional view of one end portion of a conventional submerged electric motor including a molded bracket connected to an end portion of a stator with parts illustrated in elevation.

For a better understanding of the nature of the present invention, a conventional submersible electric motor will now be described in conjunction with FIG. 1 of the drawings. The arrangement illustrated comprises a stator generally designated by the reference numeral 10 including an associated electrical component 12 buried in a molded member 14 of a synthetic resin which, in turn, encapsulates the main body of the stator 10 except for the inner cylindrical surface and which has an inner cylindrical surface axially flush with that of the main stator 10 body except for both end portions thereof. The arrangement further comprises a rotor generally designated by the reference numeral 16 and opposite to the main stator 10 body through a narrow annular gap, and a rotor shaft 18 fixedly extending through the rotor 16 and rotatably journalled by a molded bracket 20. The bracket 20 is firmly connected on one end portion to an adjacent end portion of the stator 10 or the molded member 14 through a socket and spigot joint including cylindrical surfaces 10a and 20a of the molded member 14 of the stator 10 and the bracket 20 coaxial to the common longitudinal axis of the stator 10 and the bracket 20 and abutting against each other. The cylindrical surface 10a of the molded member 14 terminates at an annular step forming the end of the inner cylindrical surface of the molded member 14. The bracket 20 includes an annular flow path 21 formed between the rotor shaft 18 and a radially inner cylindrical surface thereof in order to enable a cooling and lubricating liquid 22 to flow within the bracket 20.

As shown in FIG. 1, a hollow cylindrical can 24 formed, for example, of thin sheet stainless steel is fixedly fitted into a cylindrical opening defined by the radially inner cylindrical surface of the main stator 10 body and that of the molded member 14 flush with each other and extended through the axial length of the radially inner surface of the stator 10. The bracket 20 has the abutting cylindrical surface 20a connected via an annular step to a cylindrical end portion thereof abutting against the can 24 and a circumferential groove of a rectangular cross section located on the cylindrical end portion adjacent to the end of the can 24. Then an annular sealing member 26 is inserted into the circumferential groove and abuts against the can 24 to form a sealng means for preventing the cooling and lubricating liquid 2Z having come between the bracket 20 and the can 24 from the rotor side in the direction of the arrow X shown in FIG. 1 from further advancing toward the socket and spigot joint.

On the other hand, ambient water might pass through the socket and spigot joint until it reaches the end of the can 24. Then the ambient water can be divided into one portion which comes between the can 24 and the bracket 20 as shown by the arrow Y on FIG. 1 and the other portion which comes between the molded member 14 and the can 24 as shown by the arrow Z in FIG. 1. The one portion of the water is prevented from further coming between the bracket 20 and the can 24 due to the presence of the sealing member 26. However the abutting surfaces of the molded member 14 of the stator 10 and the can 24 are exposed to the other portion of the water. If an exfoliation occurs between abutting surfaces of the molded member 14 and the can 24 then the water enters the exfoliated portions. Thus the exfoliation is accelerated while the entered water penetrates through the molded member 14. As a result, the disadvantage has occurred that the electric component 12 buried in the molded member 14 decreases in insulation resistance.

The present invention contemplates to eliminate the disadvantage of the prior art practice as described above by the provision of an annular sealing member located between and abutting against at least one of a front and an end surface of an extension of the can extending beyond a radial bottom surface in the form of an annulus perpendicularly connected on the radially outer periphery to the cylindrical surface at the molded member of the stator partly abutting against a cylindrical surface of the bracket and at least one of the abutting cylindrical surface and the radial bottom surface of the molded member, at least one portion of the sealing member abutting against a radial front end surface in the form of an annulus of the bracket perpendicularly connected on a radially outer periphery to the abutting cylindrical surface thereof to be put in spaced parallel relationship with the radial bottom surface of the molded member whereby the annular sealing member is compressed enough to prevent the cooling and lubricating liquid flowing in the bracket from flowing out from the bracket and also prevent ambient water from entering the interior of the bracket.

Figure 2:
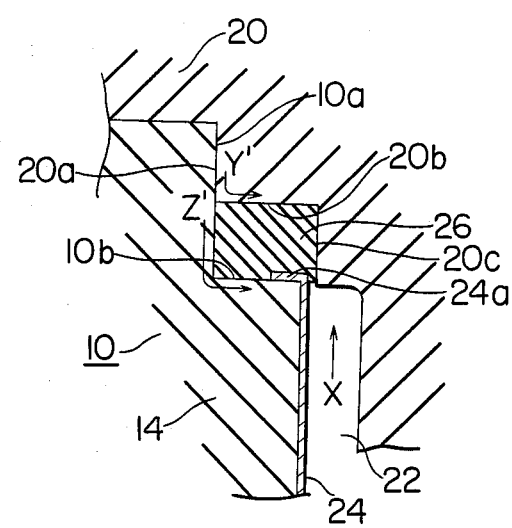
FIG. 2 is a fragmental longitudinal sectional view, in an enlarged scale, of one part of an end portion of a stator of a submerged electric motor connected to a molded bracket through a socket and spigot joint and one embodiment according to the sealing member of the present invention disposed adjacent to the socket and spigot joint.

Referring now to FIG. 2, there is illustrated a part of one end portion of a molded bracket of a submerged electric motor connected to an associate (upper) end portion of a molded member of a stator through a socket and spigot joint and one embodiment according of the sealing member of the present invention interposed between those end portions. The arrangement illustrated comprises the molded member 14 of the stator 10 such as described in conjunction with FIG. 1 including an outer annular end surface perpendicular to the longitudinal axis thereof and having a predetermined radial dimension, a radially inner upper cylindrical surface 10a connected at the upper end as viewed in FIG. 2 to the outer annular end surface and at the lower end as viewed in FIG. 2 to a radial bottom surface 10b in the form of an annulus. The radial bottom surface 10b is connected on the radially inner periphery to the radially inner cylindrical surface of the molded member 14 which is flush with the inner cylindrical surface of the main stator 10 body (not shown) as described above in conjunction with FIG. 1.

The annular end surface, the cylindrical surface 10a and the radial bottom surface 10b forms a socket of the socket and spigot joint.

As in the arrangement of FIG. 1, a hollow cylindrical can 24 such as described above in conjunction with FIG. 1 is fixedly fitted into a cylindrical opening defined by the inner cylindrical surfaces of the molded member 14 and the main stator 10 body. In this example, it is noted that the can 24 includes an annular upper end portion 24a as viewed in FIG. 2 somewhat extending beyond (above) the radial bottom surface 10b of the molded member 14 and radially outward bent on the bottom surface 10b to form a flange 24a intimately contacted by the bottom surface 10b.

On the other hand, the molded bracket 20 includes an outer annular end surface coextensive with and abutting against that on the molded member 14 and a radially inner cylindrical surface 20a snugly fitted into a cylindrical opening defined by the radially inner cylindrical surface 10a of the molded member 14. The radially inner cylindrical surface 20a of the bracket 20 is shorter a predetermined axial length than the radially inner cylindrical surface 10a of the molded member and terminates at a radial front end surface 20b in the form of an annulus. The radial front end surface 20b is somewhat longer in radial dimension than the radial bottom surface 10b and connected on the radially inner periphery to a cylindrical surface 20c coaxial with the longitudinal axis of the bracket 20 and more or less longer in axial length than a difference in the axial length between the cylindrical surfaces 10a and 20a of the molded member 14 and the bracket 20. The cylindrical surface 20c is connected to an annular surface perpendicular to the longitudinal axis of the bracket 20 and connected to a small diameter cylindrical end portion extending along the longitudinal axis of the bracket 20.

The outer annular end surface, of the bracket 20, the cylindrical surface 20a and the radial front end surface 20b form a spigot of the socket and spiral joint with the cylindrical portions continuous to the front end surface 20b.

When the bracket 20 is fixedly connected to the molded member 14 by having the outer annular end surfaces abutting against each other and the cylindrical surface 20acontacted by the cylindrical surface 10a, an annular space with a rectangular cross section is defined by the cylindrical surface 10a and the radial bottom surface 10b of the molded member 14 and the radial front end surface 20b and the cylindrical surface 20c connected to the surface 20b with a corner of the can 24 slightly spaced from the lower end as viewed in FIG. 2 of the cylindrical surface 20c of the bracket 20.

This annular space is fitted with an annular sealing member 26 complementary in shape to and somewhat larger in dimension than the same.

To this end, the sealing member 26 is first put on the radial bottom surface 10b of the molded member 14 so as to abut against the cylindrical surface 10a thereof and then the bracket 20 is inserted into molded member 14 until the bracket 20 is connected to the molded member 14 through the engagement of the associated surfaces. At that time, the sealing member 26 is pressed against at least the upper surface as viewed in FIG. 2 of the flange 24a and more particularly against the upper and end surfaces thereof as well as being pressed against at least the cylindrical and radial bottom surfaces 10a and 10b respectively of the molded member 14. More particularly, the sealing member 26 is pressed against the upper surface of the flange 24a and the cylindrical and bottom surfaces 10a and 10b respectively of the molded member 14 and therefore confined by those surfaces.

Under these circumstances, the cooling and lubricating liquid 22 may come between the can 24 and the cylindrical surface of the bracket 20 opposite to the can 24 in the direction of the arrow X shown in FIG. 2 until it reaches the sealing member 26 through an annular gap formed between the bent portion of the can 24 and the lowermost end of the cylindrical surface 20c of the bracket 20. However, the sealing member 26 is compressed enough to block the cooling and lubricating liquid 22. Thus the liquid is prevented from further coming between the cylindrical surfaces 10a and 20a through the sealing member 26.

On the other hand, ambient water may come between the outer annular surfaces of the bracket and the molded member 20 and 14 respectively and then between the abutting cylindrical surfaces 20a and 10a thereof. This water may come along the front end surface 20b of the bracket 20 as shown by the arrow Y' in FIG. 2. Alternatively the water may come along the cylindrical and bottom surfaces 10a and 10b respectively of the molded member 14 as shown by the arrow Z' in FIG. 2. The sealing member 26, however, blocks a further entry of the water in the direction of either the arrow Y' or the arrow Z'.

Figure 3:
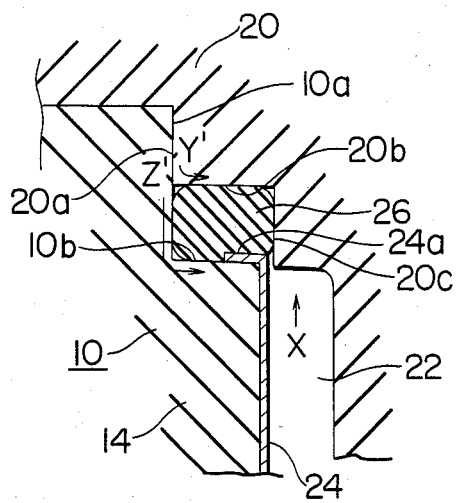
FIG. 3 is a view similar to FIG. 2 but illustrating a modification of the arrangement shown in FIG. 2.

FIG. 3 shows a modification of the arrangement illustrated in FIG. 2. The arrangement illustrated is different from that shown in FIG. 2 only in that in FIG. 3 the sealing member 26 has a circular cross section. The sealing member 20 is forcedly inserted into the annular spaces as described above in conjunction with FIG. 2 so that it is deformed into a regtangular cross section having four round corners as shown in FIG. 3.

In other respects the arrangement is identical to that shown in FIG. 2

Figure 4:
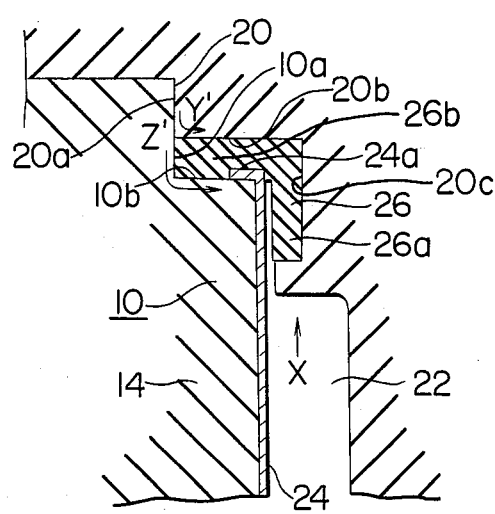
FIG. 4 is a view similar to FIG. 2 but illustrating a modification of the present invention.

The arrangement illustrated in FIG. 4 is different from that shown in FIG. 2 only in that in FIG. 4 the sealing member 26 is in the form of a flanged hollow cylinder and the annular space for accommodating the same is modified correspondingly.

As shown in FIG. 4, the sealing member 26 has a longitudinal section in the form of an inverted L having one leg 26a disposed parallel to the longitudinal axis of the common longitudinal axis of the stator 10 and the bracket 20 to form a hollow cylinder 26a and the other leg 26b disposed perpendicularly to the common longitudinal axis to form a sealing flange 26b radially outward extending from the end of the hollow cylinder 26a. When the sealing flange 26b of the sealing member 26 is disposed on the radial bottom surface 10b of the molded member 14 so as to abut against the cylindrical surface 10a thereof, the hollow cylinder 26a is inserted into the can 24 to leave therebetween a predetermined annular gap which is substantially equal to the annular gap formed between the lower end of the cylindrical surface 26c of the bracket 20 and the opposite portion of the can 24 as shown in FIG. 2.

On the other hand, the bracket 20 includes the radial front end surface 20b in the form of an annulus as in the arrangement shown in FIGS. 2 or 3 but substantially coextensive with the upper surface as viewed in FIG. 4 of the sealing flange 26b and arranged to form an axial spacing between the same and the radial bottom surface 10b of the molded member 14 sufficient to sandwich the sealing flange 26b in a more or less compressed state therebetween. The radial front end surface 20b is connected on the radially inner periphery to the cylindrical surface 20c similar to that shown in FIGS. 2 or 3 but located at its position where it abuts against the entire area of the radially inner surface of the hollow cylinder 20a having the radially outer surface spaced from the can 24 by the predetermined annular gap as described above. The cylindrical surface 20c terminates at a radial bottom surface radially outward extended to a radial dimension somewhat shorter the width of the hollow cylinder 26a to hold the latter. This bottom surface is connected to a small diameter cylindrical end portion of the bracket 20.

From the foregoing it is seen that by engaging the flanged sealing member 26 with the radial front surface 20b, the cylindrical surface 20c and the radial end surface of the bracket 20, the latter can be inserted into the associated end portion of the molded member 14 until it is firmly connected to the molded member through a socket and spigot joint formed therebetween. While the sealing flange 26b is sandwiched in a more or less compressed state between the radial front end surface 20b and the radial bottom surface 10b and the hollow cylinder of the sealing member 26 is held in a more or less compressed state by the front end surface 20b, the cylindrical surface 20c and the end surface. Thus the sealing is completed between the bracket 20 and the stator 10 or the molded member 14.

Figure 5:
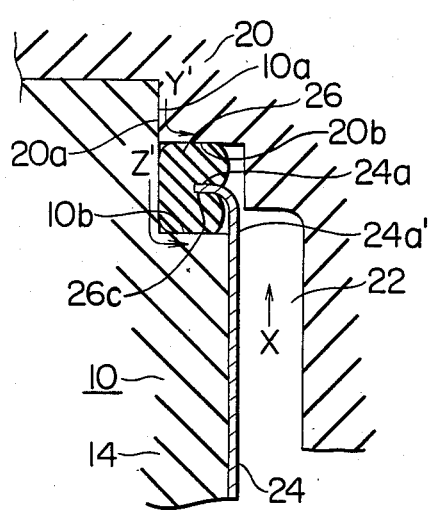
FIG. 5 is a view similar to FIG. 2 but illustrating another modification of the present invention.

The arrangement illustrated in FIG. 5 is different from that shown in FIG. 3 principally in that in FIG. 5 the can 24 extends beyond the radial bottom surface 10b of the molded member 14 to form an extension including a hollow cylindrical portion 24a' and a radially outward directed flange 24a merged into the upper end as viewed in FIG. 5 of the hollow cylindrical portion 24a'. The flange 24a is located at its position approximately equidistant from the radial bottom surface 10b of the molded member 14 and the radial front end surface 20b of the bracket 20 in the axial direction. As in the arrangement of FIG. 3, a sealing member 26 of a circular cross section is forcedly put between the radial front end surface 20b of the bracket 20 and the radial bottom surface 10b of the molded member but is pressed against the cylindrical surface 10a of the molded member 14 by fitting at least the extremity of the flange 24a into a circumferential groove 26c disposed on the radially inner surface of the sealing member and coinciding in position with the flange 24a of the sealing member 14. Thus the sealing member 26 has a radially inner surface which does not abut against the cylindrical surface 20c of the bracket 20 opposite to the cylindrical surface 10a of the molded member 14.

Figure 6:
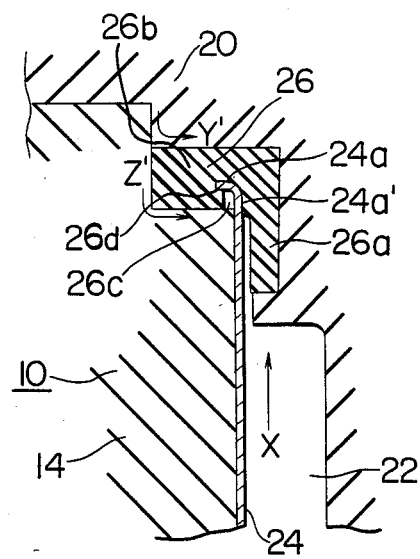
FIG. 6 is a view similar to FIG. 2 but illustrating still another modification of the present invention.

The arrangement illustrated in FIG. 6 is different from that shown in FIG. 4 only in that in FIG. 6 the can 24 extends as in the arrangement of FIG. 5 and the extended portion thereof is fitted into the sealing flange 26b of the sealing member 26. More specifically, the can 24 includes an extended hollow cylindrical portion 24a' and flange 24a similar to those described above in conjunction with FIG. 5 and the sealing member 26 is provided on the sealing flange 26b with a cylindrical groove 26c opening on the lower surface of the sealing flange 26b so as to form an extension of the can 24 and a radial annular groove 26d merged into the cylindrical groove 26c so as to be complementary in shape to the cylindrical portion 24a' and the flange 24a connected to the cylindrical portion 24a' as described above in conjunction with FIG. 5.

The cylindrical portion 24a' and the flange 24a of the can 24 are fitted into the grooves 26c and 26d continuous to each other.

In the arrangement shown in each of FIGS. 2 through 6, the sealing member 26 is interposed between the radial bottom surface 10b of the molded member 14 and the radial front end surface 20b of the bracket 20 to be more or less compressed whereby the bracket 20 is fastened in sealed relationship to the molded member 14 of the stator 10 through the abutting of the cylindrical surface 20a of the bracket 20 against the cylindrical surface 10a of the molded member 14.

Accordingly, the sealing member 26 is pressed against at least the surface of the flange 24a of the can, and more particularly the upper and end surfaces thereof as well as being pressed against at least the abutting cylindrical surface 10a and the radial bottom surface 10b of the molded member 14 and more particularly of the cans flange 24a and also the upper surface of the flange 24a and the radial bottom surface 10b of the abutting cylindrical surface 10a on the stator side for sealing purposes.

Since the present invention is constructed and assembled as described above, the bracket 20 presses against the sealing member 26 thereby to press the latter against the radial front end surface 20b thereof. Thus the sealing member 26 prevents the cooling and lubricating liquid 22 which has reached the same in the direction of the arrow X shown in each of FIGS. 3 through 6 from further entering in the direction of the arrow X as described above in conjunction with FIG. 2. Also ambient water may come between the molded member 14 and the bracket 20 to form a stream of water flowing along the bracket 20 in the direction of the arrow Y' shown in each of FIGS. 3 through 6 and a stream of water flowing along the molded member 14 in the direction of the arrow Z' shown in each of those Figures as described above in conjunction with FIG. 2. The sealing member 26 effectively blocks those streams of water. Thus ambient water is prevented from coming between the joined surfaces of the can and the molded member. Therefore, no exfoliation occurs between the can and the molded member and also such exfoliation is not accelerated. This means that moisture does not penetrates through the molded member.

While the present invention has been illustrated and described in conjunction with a few preferred embodiments thereof it is to be understood that numerous changes and modifications may be resorted to without departing from the spirit and scope of the present invention. For example, the present invention has been illustrated and described in terms of the can radially outward perpendicularly bent into a flange, but it is to be understood that the present invention is not restricted thereto or thereby and that the can may have the extension in the form of a conical tube flared toward its end or of a straight tube. Also if desired, the bracket may be formed of a suitable material other than a synthetic resin.

What is claimed is:

1. A submerged electric motor comprising a stator encapsulated by a hollow cylindrical molded member of a synthetic resin except for an inner cylindrical surface thereof, a hollow cylindrical can disposed on the inner cylindrical surface of said stator and extended to be disposed on an inner cylindrical surface of said molded member flush with that of said stator except for both end portions, a bracket connected on one end portion to an associated end portion of said molded member of said stator through a socket and spigot joint and journalling a rotor shaft, said socket and spigot joint including at least cylindrical surfaces of said molded member and said bracket coaxial with the common central axis thereof, said cylindrical surface of said bracket abutting against an end portion of said cylindrical surface of said molded member located on said associated end portion thereof, said can having a radially outwardly extending flange adjacent to said bracket extending above a radial bottom surface in the form of an annulus connected on a radially outer periphery to said cylindrical surface of said molded member, and an annular sealing member located between and abutting against at least one of a top and an end surface of said flange and at least one of said cylindrical surfaces and said radial botton surface of said molded member, at least one portion of said sealing member abutting against a radial front end surface in the form of an annulus of said bracket connected on a radially outer periphery to said abutting cylindrical surface thereof to be put in spaced parallel relationship with said radial bottom surface of said molded member, said annular sealing member having a radially inner surface having an annular groove therein, said flange fitting into said groove, whereby said sealing member is compressed enough to prevent a cooling and lubricating liquid flowing in said bracket from flowing out from said bracket and also prevent ambient water from entering the interior of said bracket.

2. A submersible electric motor as claimed in claim 1 wherein said extended portion extends radially outward to define a flange.

3. A submersible electric motor as claimed in claim 2 wherein said flange has a bottom surface abutting said annular molded member surface.

4. A submersible motor as claimed in claim 3 wherein said front can surface includes a top surface of said flange opposite said bottom surface, said at least one of said front can surface and said free end surface abutting against said sealing member including said top surface of said flange.

5. A submersible electric motor as claimed in claim 4 wherein said sealing member has a rectangular cross section in a radially and axially extending plane.

6. A submersible electric motor as claimed in claim 4 wherein said sealing member has a circular cross section in an uncompressed state, in a radially and axially extending plane.

7. A submersible electric motor as claimed in claim 4 wherein said sealing member has a longitudinal section in the form of an inverted L so that said sealing member includes a hollow cylindrical portion and a sealing flange portion continuous to said hollow cylindrical portion and extended radially outward, said hollow cylindrical portion extending into said can to leave an annular gap therebetween, said sealing flange portion abutting said bracket cylindrical surface.

8. A submersible motor as claimed in claim 2 wherein said sealing member has a radially inner surface having an annular groove therein, said flange being fitted into said groove.

9. A submersible electric motor as claimed in claim 8 wherein said sealing member has a rectangular cross section in a radially and axially extending plane.

10. A submersible electric motor as claimed in claim 8 wherein said sealing member has a circular cross section in an uncompressed state in a radially and axially extending plane.

11. A submersible electric motor as claimed in claim 8 wherein said sealing member has a longitudinal section in the form of an inverted L so that said sealing member includes a hollow cylindrical portion and a sealing flange portion continuous to said hollow cylindrical portion and extended radially outward, said hollow cylindrical portion extending into said can to leave an annular gap therebetween, the sealing flange portion abutting said bracket cylindrical surface.

12. A submersible electric motor, comprising:

a stator having an inner cylindrical stator surface having a common center axis;

a hollow cylindrical molded synthetic resin member having a central inner cylindrical molded surface continuous with said stator surface, encapsulating said stator except for said inner stator surface, and having opposite upper and lower axial end portions;

a hollow cylindrical can located inside, and having a cylindrical radially outer can surface flush with, said inner stator surface and said central molded member surface;

a rotor shaft extending axially along said central axis inside said molded member;

a bracket coaxial with said molded member, connected to said upper end portion by a socket and spigot joint and journalling said rotor shaft; and means, including an annular sealing member in said joint, for preventing liquid from passing into and out of said motor through said joint;

said joint including an upper molded member cylindrical surface of said molded member above said central molded member cylindrical surface and a bracket cylindrical surface abutting said upper molded member cylindrical surface at said upper end portion, both symmetrically disposed about said common axis;

said bracket having an annular bracket surface extending radially with respect to said axis, said annular bracket surface having a radially outer end intersecting said bracket cylindrical surface at a lower end thereof;

said molded member having an annular molded member surface extending radially with respect to said axis from a lower end of said upper molded member cylindrical surface to an upper end of said central molded member cylindrical surface and being below, axially spaced from, and opposed to said annular bracket surface;

said can having a cylindrical radially inner can surface opposite said outer can surface and a circular free end surface between said inner and outer can surfaces, said can including a can end portion adjacent to said bracket, extending above said annular molded member surface and terminating at said can end surface, said can having a front can surface on said can end portion above said annular molded member surface, joining said inner can surface and said free end surface and being symmetrically disposed about said axis;

said sealing member being disposed in a spaced defined between said annular molded member surface and said annular bracket surface so as to abut said annular molded member surface, said annular bracket surface, said upper molded member cylindrical surface and at least one of said free end surface and said front can surface and be sufficiently compressed by opposing ones thereof as to prevent cooling and lubricating liquid flowing upward along said can inner surface from flowing through said joint and to prevent ambient water outside said motor from flowing through said joint into said motor.

13. A submersible electric motor as claimed in claim 12 wherein said sealing member has a rectangular cross section in a radially and axially extending plane.

14. A submersible electric motor as claimed in claim 12 wherein said sealing member has a rectangular cross section in a radially and axially extending plane.

15. A submersible electric motor as claimed in claim 12 wherein said sealing member has a circular cross section in an uncompressed state in a radially and axially extending plane.

16. A submersible electric motor comprising a stator encapsulated by a hollow cylindrical molded member of a synthetic resin except for an inner cylindrical surface thereof, a hollow cylindrical can disposed on the inner cylindrical surface of said stator and extended to be disposed on an inner cylindrical surface of said molded member flush with that of said stator except for both end portions; a bracket connected on one end portion to an associated end portion of said molded member of said stator through a socket and spigot joint and journalling a rotor shaft, said socket and spigot joint including at least cylindrical surfaces of said molded member and said bracket coaxial with the common central axis thereof, said cylindrical surface of said bracket abutting against an end portion of said cylindrical surface of said molded member located on said associated end portion thereof, said can having a radially outwardly extending flange adjacent to said bracket extending above and abutting against a radial bottom surface in the form of an annulus connected on a radially outer periphery to said cylindrical surface of said molded member, and an annular sealing member located between and abutting against at least the top surface of said flange and at least one of said cylindrical surfaces and said radial bottom surface of said molded member, at least one portion of said sealing member abutting against a radial front end surface in the form of an annulus of said bracket connected on a radially outer periphery to said abutting cylindrical surface thereof to be put in spaced parallel relationship with said radial bottom surface of said molded member, said sealing member having a longitudinal section in the form of an inverted L so that said sealing member includes hollow cylindrical portion and a sealing flange portion continuous to said hollow cylindrical portion and extended radially outward, said hollow cylindrical portion extending into said can to leave an annular gap therebetween, said sealing flange portion abutting against said radial front end surface of said bracket whereby said sealing member is compressed enough to prevent a cooling and lubricating liquid flowing in said bracket from flowing out from said bracket and also prevent ambient water from entering the interior of said bracket.

* * * * *